US012598659B2

(12) United States Patent
Zhang et al.

(10) Patent No.: US 12,598,659 B2
(45) Date of Patent: Apr. 7, 2026

(54) METHOD FOR ESTABLISHING CONNECTED STATE, TERMINAL, CORE NETWORK FUNCTION, AND ACCESS NETWORK DEVICE

(71) Applicant: VIVO MOBILE COMMUNICATION CO., LTD., Chang'an Dongguan (CN)

(72) Inventors: Yizhong Zhang, Chang'an Dongguan (CN); Zhenhua Xie, Chang'an Dongguan (CN); Wen Wang, Chang'an Dongguan (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 348 days.

(21) Appl. No.: 18/137,201

(22) Filed: Apr. 20, 2023

(65) Prior Publication Data

US 2023/0262794 A1 Aug. 17, 2023

Related U.S. Application Data

(63) Continuation of application No. PCT/CN2021/128191, filed on Nov. 2, 2021.

(30) Foreign Application Priority Data

Nov. 6, 2020 (CN) .......................... 202011233721.9

(51) Int. Cl.
*H04W 76/14* (2018.01)
*H04W 76/20* (2018.01)

(52) U.S. Cl.
CPC ........... *H04W 76/14* (2018.02); *H04W 76/20* (2018.02)

(58) Field of Classification Search
CPC . H04W 76/14; H04W 76/20; H04W 74/0833; H04W 92/18; H04W 88/02
See application file for complete search history.

(56) References Cited

U.S. PATENT DOCUMENTS

| 12,058,745 B2 * | 8/2024 | Luo | ........................ | H04W 76/11 |
| 2018/0295497 A1 * | 10/2018 | Kim | ........................ | H04W 8/08 |

(Continued)

FOREIGN PATENT DOCUMENTS

| CN | 109547955 A | 3/2019 |
| CN | 110798814 A | 2/2020 |

(Continued)

OTHER PUBLICATIONS

Lenovo, et al., "Considerations on the UE-to-Network relay and UE-to-UE relay case," 3GPP TSG-RAN WG2 Meeting #112 electronic, R2-2009858, pp. 1-5, (Nov. 2-13, 2020).

(Continued)

*Primary Examiner* — Ricky Q Ngo
(74) *Attorney, Agent, or Firm* — Price Heneveld LLP

(57) ABSTRACT

This application discloses a method for establishing a connected state, a terminal, a core network function, and an access network device. A method for establishing a connected state performed by a first terminal includes: receiving first information sent by a second terminal, where the first information includes at least one of: a second identifier, and network access information; and sending first indication information to a network side, where the first indication information includes at least one of: the second identifier, and a first identifier. The second identifier is used for indicating, to the network side, that the second terminal enters a connected state, and the first identifier is used for indicating, to the network side, that the first terminal enters a connected state.

14 Claims, 10 Drawing Sheets

(56)          References Cited

U.S. PATENT DOCUMENTS

| | | | |
|---|---|---|---|
| 2020/0029368 A1* | 1/2020 | Yang | H04W 74/0833 |
| 2020/0077253 A1* | 3/2020 | Kim | H04W 76/30 |
| 2020/0100308 A1* | 3/2020 | Lee | H04W 76/25 |
| 2021/0345442 A1 | 11/2021 | Wu et al. | |
| 2021/0368473 A1 | 11/2021 | Liu et al. | |
| 2022/0086931 A1* | 3/2022 | Tenny | H04W 76/14 |
| 2022/0304099 A1* | 9/2022 | Kim | H04W 76/32 |
| 2023/0014030 A1* | 1/2023 | Li | H04W 76/10 |

FOREIGN PATENT DOCUMENTS

| | | | |
|---|---|---|---|
| CN | 111278002 A | 6/2020 | |
| CN | 111432469 A | 7/2020 | |
| EP | 4110008 A1 | 12/2022 | |

OTHER PUBLICATIONS

International Search Report and Written Opinion of the International Searching Authority dated Dec. 24, 2021 as received In Application No. PCT/CN2021/128191.

* cited by examiner

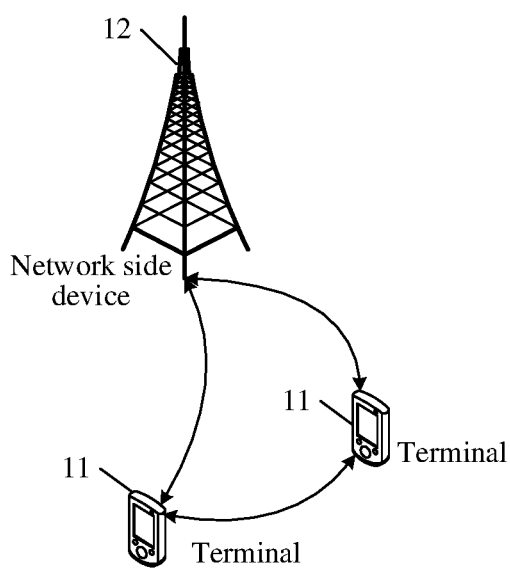

FIG. 1

Receive first information sent by a second terminal, where the first information includes at least one of: a second identifier; and network access information — 21

Send first indication information to a network side, where the first indication information includes at least one of: the second identifier; and a first identifier — 22

FIG. 2

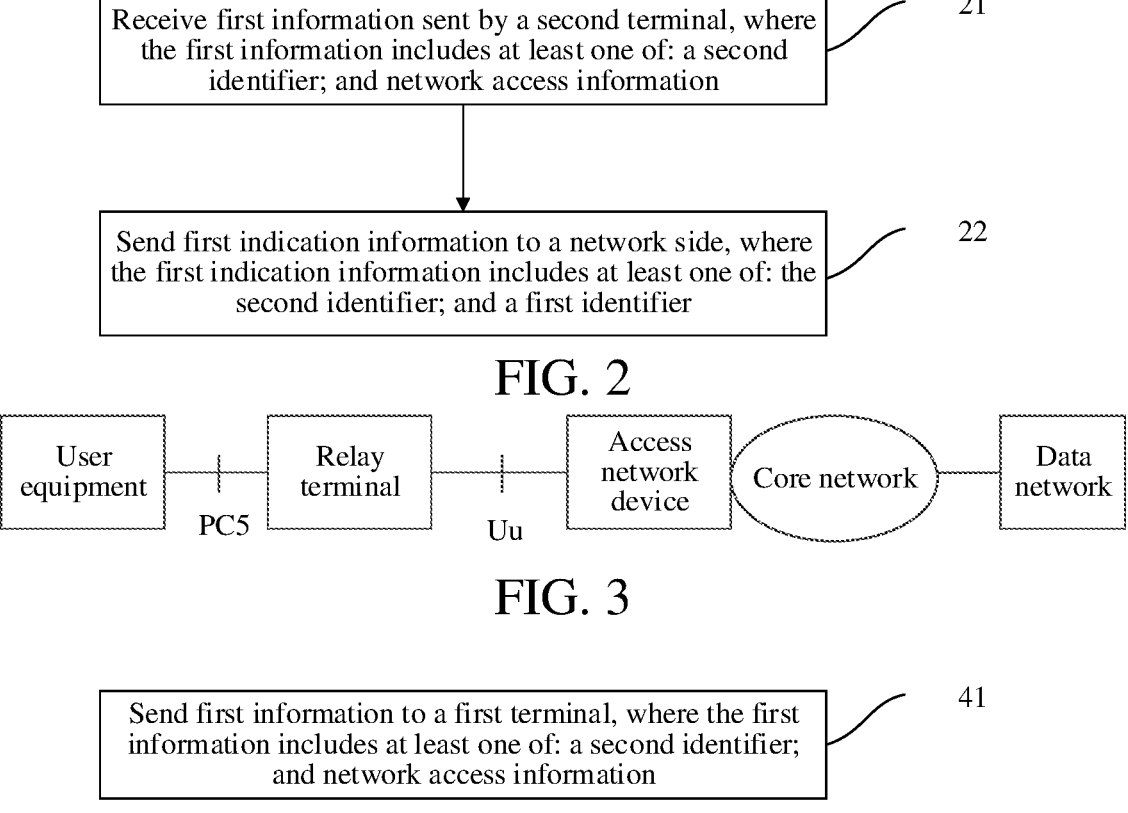

FIG. 3

Send first information to a first terminal, where the first information includes at least one of: a second identifier; and network access information — 41

FIG. 4

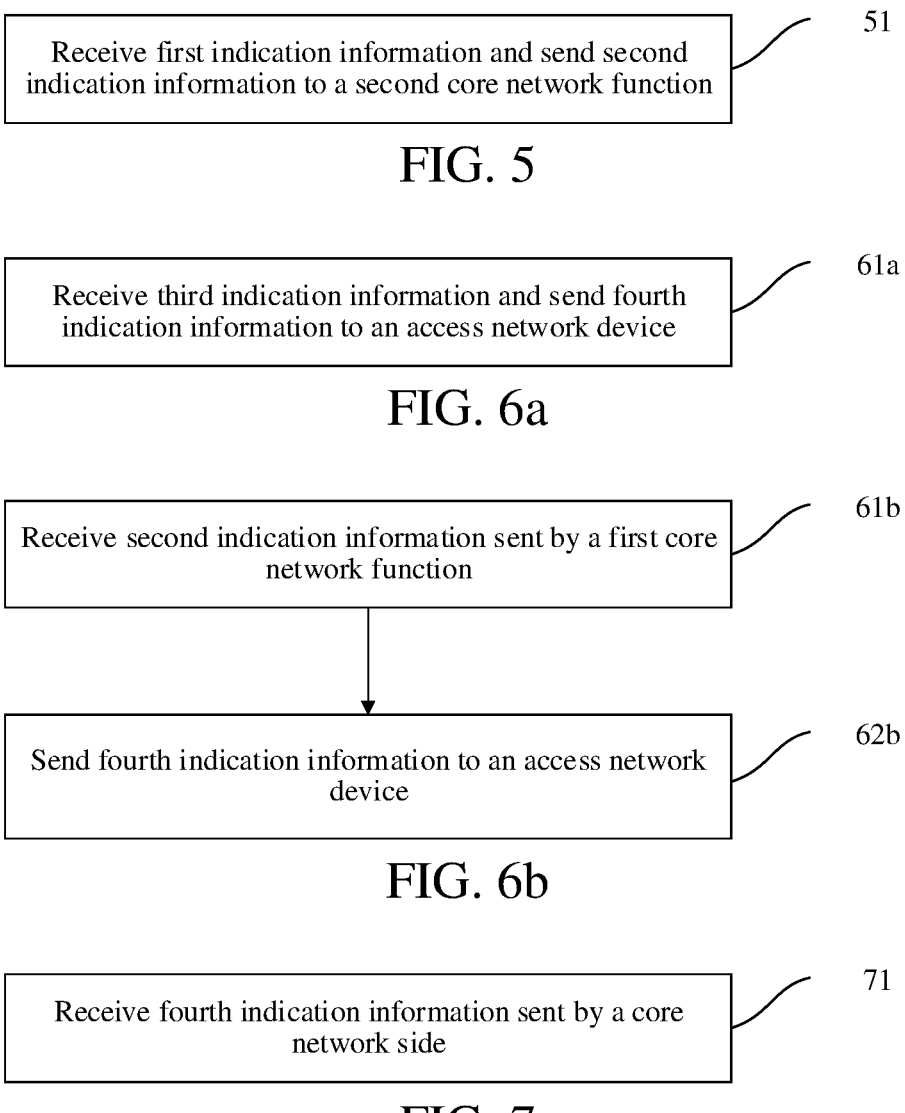

Receive first indication information and send second
indication information to a second core network function    51

FIG. 5

Receive third indication information and send fourth
indication information to an access network device    61a

FIG. 6a

Receive second indication information sent by a first core
network function    61b Send fourth indication information to an access network
device    62b

FIG. 6b

Receive fourth indication information sent by a core
network side    71

First receiving module

142

First sending module

Sending module

First transceiver module

170a

171a

Second transceiver module

170a

171a

Second transceiver module

METHOD FOR ESTABLISHING CONNECTED STATE, TERMINAL, CORE NETWORK FUNCTION, AND ACCESS NETWORK DEVICE

CROSS-REFERENCE TO RELATED APPLICATIONS

This application is a continuation application of PCT International Application No. PCT/CN2021/128191 filed on Nov. 2, 2021, which claims the priority of Chinese Patent Application No. 202011233721.9 filed in China on Nov. 6, 2020, which are incorporated in their entireties by reference herein.

TECHNICAL FIELD

This application relates to the field of wireless communication technologies, and in particular, to a method for establishing a connected state, a terminal, a core network function, and an access network device.

BACKGROUND

Under a relay (Relay) architecture, if a remote terminal, also known as user equipment (User Equipment, UE), needs to perform relay transmission by using a relay terminal, both the user equipment and the relay terminal need to enter a connected state.

Under the current relay architecture, when the user equipment and the relay terminal need to enter the connected state, the user equipment and the relay terminal need to respectively perform processes of establishing connection of their own connected states, which requires much signaling overhead.

SUMMARY

A purpose of embodiments of this application is to provide a method for establishing a connected state, a terminal, a core network function device, and an access network device.

According to a first aspect, a method for establishing a connected state is provided, and performed by a first terminal. The method includes:

receiving first information sent by a second terminal, where the first information includes at least one of: a second identifier, and network access information; and sending first indication information to a network side, where the first indication information includes at least one of: the second identifier, and the first identifier.

The second identifier is used for indicating, to the network side, that the second terminal enters a connected state, and the first identifier is used for indicating, to the network side, that the first terminal enters a connected state.

According to a second aspect, a method for establishing a connected state is provided, and performed by a second terminal. The method includes:

sending first information to a first terminal, where the first information includes at least one of: a second identifier; and network access information.

The second identifier is used for indicating, to a network side, that the second terminal enters a connected state.

According to a third aspect, a method for establishing a connected state is provided, and performed by a first core network function. The method includes:

receiving first indication information and sending second indication information to a second core network function; or, receiving third indication information and sending fourth indication information to an access network device, where the first indication information includes at least one of: a second identifier, and a first identifier;

the second indication information includes any one of: the second identifier, and the first identifier;

the third indication information includes at least one of: the second identifier, and the first identifier; and the fourth indication information includes any one of: the second identifier, and the first identifier.

The second identifier is used for indicating, to the second core network function or the access network device, that a second terminal indicated by the second identifier enters a connected state, and the first identifier is used for indicating, to the second core network function or the access network device, that a first terminal indicated by the first identifier enters a connected state.

According to a fourth aspect, a method for establishing a connected state is provided, and performed by a second core network function. The method includes:

receiving second indication information sent by a first core network function; and sending fourth indication information to an access network device, where the second indication information includes any one of: the second identifier, and the first identifier; and the fourth indication information includes any one of: the second identifier, and the first identifier.

The second identifier is used for indicating, to the second core network function or the access network device, that a second terminal indicated by the second identifier enters a connected state, and the first identifier is used for indicating, to the second core network function or the access network device, that a first terminal indicated by the first identifier enters a connected state.

According to a fifth aspect, a method for establishing a connected state is provided, and performed by an access network device. The method includes:

receiving fourth indication information sent by a core network side, where the fourth indication information includes any one of: a second identifier, and a first identifier.

The second identifier is used for indicating, to the access network device, that a second terminal indicated by the second identifier enters a connected state, and the first identifier is used for indicating, to the access network device, that a first terminal indicated by the first identifier enters a connected state.

According to a sixth aspect, an apparatus for establishing a connected state is provided. The apparatus includes:

a first receiving module, configured to receive first information sent by a second terminal, where the first information includes at least one of: a second identifier, and network access information; and a first sending module, configured to send first indication information to a network side, where the first indication information includes at least one of: the second identifier, and the first identifier.

The second identifier is used for indicating, to the network side, that the second terminal enters a connected state, and the first identifier is used for indicating, to the network side, that the first terminal enters a connected state.

According to a seventh aspect, an apparatus for establishing a connected state is provided. The apparatus includes:

a sending module, configured to send first information to a first terminal, where the first information includes at least one of: a second identifier; and network access information.

The second identifier is used for indicating, to a network side, that a second terminal enters a connected state.

According to an eighth aspect, an apparatus for establishing a connected state is provided. The apparatus includes:

a first transceiver module, configured to receive first indication information and send second indication information to a second core network function; or, a second transceiver module, configured to receive third indication information and send fourth indication information to an access network device, where the first indication information includes at least one of: a second identifier, and a first identifier;

the second indication information includes any one of: the second identifier, and the first identifier;

the third indication information includes at least one of: the second identifier, and the first identifier; and the fourth indication information includes any one of: the second identifier, and the first identifier.

The second identifier is used for indicating, to the second core network function or the access network device, that a second terminal indicated by the second identifier enters a connected state, and the first identifier is used for indicating, to the second core network function or the access network device, that a first terminal indicated by the first identifier enters a connected state.

According to a ninth aspect, an apparatus for establishing a connected state is provided. The apparatus includes:

a receiving module, configured to receive second indication information sent by a first core network function; and a sending module, configured to send fourth indication information to an access network device, where the second indication information includes any one of: the second identifier, and the first identifier; and the fourth indication information includes any one of: the second identifier, and the first identifier.

The second identifier is used for indicating, to the second core network function or the access network device, that a second terminal indicated by the second identifier enters a connected state, and the first identifier is used for indicating, to the second core network function or the access network device, that a first terminal indicated by the first identifier enters a connected state.

According to a tenth aspect, an apparatus for establishing a connected state is provided. The apparatus includes:

a receiving module, configured to receive fourth indication information sent by a core network side, where the fourth indication information includes any one of: a second identifier, and a first identifier.

The second identifier is used for indicating, to the access network device, that a second terminal indicated by the second identifier enters a connected state, and the first identifier is used for indicating, to the access network device, that a first terminal indicated by the first identifier enters a connected state.

According to an eleventh aspect, a terminal is provided. The terminal includes a processor, a memory, and a program or an instruction stored in the memory and executable in the processor. The program or instruction, when executed by the processor, implements steps of the method according to the first aspect or the second aspect.

According to a twelfth aspect, a core network function is provided. The core network function includes a processor, a memory, and a program or an instruction stored in the memory and executable in the processor. The program or instruction, when executed by the processor, implements steps of the method according to the third aspect or the fourth aspect.

According to a thirteenth aspect, an access network device is provided. The access network device includes a processor, a memory, and a program or an instruction stored in the memory and executable in the processor. The program or instruction, when executed by the processor, implements steps of the method according to the fifth aspect.

According to a fourteenth aspect, a readable storage medium is provided. The readable storage medium stores a program or an instruction. The program or instruction, when executed by a processor, implements steps of the method according to the first aspect, the second aspect, the third aspect, the fourth aspect, or the fifth aspect.

According to a fifteenth aspect, a chip is provided. The chip includes a processor and a communication interface. The communication interface is coupled to the processor, and the processor is configured to run a program or an instruction of a network side device to implement the method according to the first aspect, the second aspect, or the third aspect; or to implement the method according to the fourth aspect, or the fifth aspect.

According to a sixteenth aspect, a computer program product is provided. The computer program product is stored in a non-transitory storage medium, and the computer program product is executed by at least one processor to implement the method according to the first aspect, the second aspect, or the third aspect; or to implement the method according to the fourth aspect, or the fifth aspect.

BRIEF DESCRIPTION OF THE DRAWINGS

To describe the technical solutions of embodiments of this application more clearly, the following briefly introduces the accompanying drawings required for describing the embodiments of this application. Apparently, the accompanying drawings in the following description show merely some embodiments of this application, and a person of ordinary skill in the art may still derive other drawings from these accompanying drawings without creative efforts.

FIG. 1 is a block diagram of a wireless communication system to which an embodiment of this application is applicable;

FIG. 2 is a schematic flowchart of a method for establishing a connected state performed by a first terminal according to an embodiment of this application;

FIG. 3 is a schematic diagram of a relay architecture;

FIG. 4 is a schematic flowchart of a method for establishing a connected state performed by a second terminal according to an embodiment of this application;

FIG. 5 is a schematic flowchart of a method for establishing a connected state performed by a first core network function according to an embodiment of this application;

FIG. 6a is a schematic flowchart of a method for establishing a connected state performed by a first core network function according to another embodiment of this application;

FIG. 6b is a schematic flowchart of a method for establishing a connected state performed by a second core network function according to an embodiment of this application;

FIG. 7 is a schematic flowchart of a method for establishing a connected state performed by an access network device according to an embodiment of this application;

FIG. 14 is a schematic structural diagram of an apparatus for establishing a connected state according to an embodiment of this application;

FIG. 15 is a schematic structural diagram of an apparatus for establishing a connected state according to another embodiment of this application;

DETAILED DESCRIPTION

Figures 8, 9:
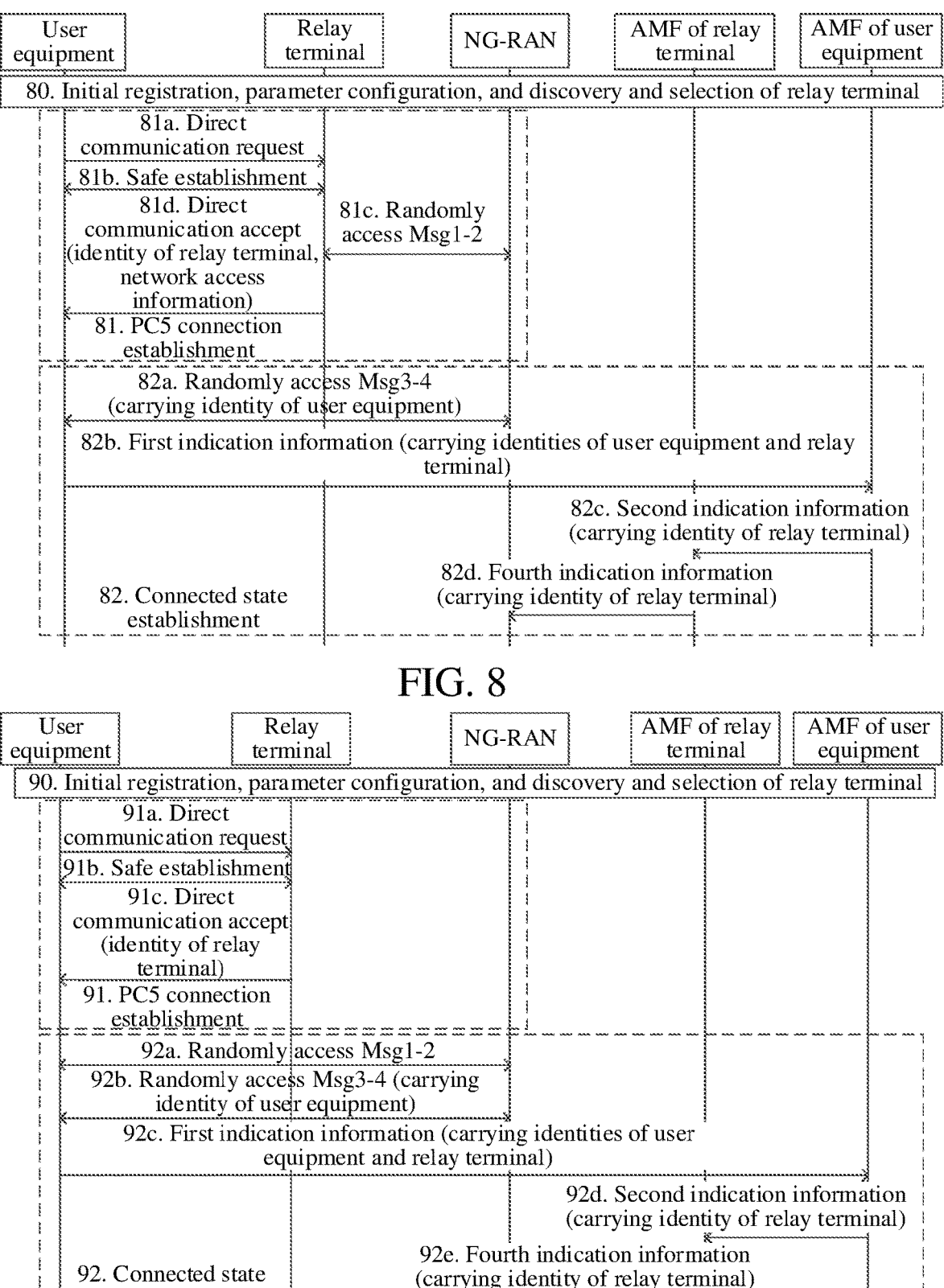
FIG. 8 is a schematic flowchart of a method for establishing a connected state according to a first embodiment of this application.
FIG. 9 is a schematic flowchart of a method for establishing a connected state according to a second embodiment of this application.

The following clearly describes the technical solutions in the embodiments of this application with reference to the accompanying drawings in the embodiments of this application. Apparently, the described embodiments are some rather than all of the embodiments of this application. All other embodiments obtained by a person of ordinary skill in the art based on the embodiments of this application without creative efforts shall fall within the protection scope of this application.

The terms such as "first" and "second" in the specification and the claims of this application are intended to distinguish between similar objects, but are not used for describing a specific sequence or a chronological order. It is to be understood that the data used in such a way is interchangeable in proper circumstances, so that the embodiments of this application can be implemented in other sequences than the sequence illustrated or described herein. In addition, objects distinguished by "first" and "second" are usually of one type, and a quantity of the objects is not limited. For example, a first object may be one or more than one. In addition, "and/or" in the specification and claims represents at least one of connected objects. The character "/" generally indicates an "or" relationship between the associated objects.

It is worth noting that technologies described in the embodiments of this application are not limited to a long term evolution (Long Term Evolution, LTE) or LTE-advanced (LTE-Advanced, LTE-A) system, but may further be used in other wireless communication systems, such as code division multiple access (Code Division Multiple Access, CDMA), time division multiple access (Time Division Multiple Access, TDMA), frequency division multiple access (Frequency Division Multiple Access, FDMA), orthogonal frequency division multiple access (Orthogonal Frequency Division Multiple Access, OFDMA), single-carrier frequency-division multiple access (Single-carrier Frequency-Division Multiple Access, SC-FDMA), and other systems. The terms "system" and "network" in the embodiments of this application are often used interchangeably, and the described technologies may be used for not only the foregoing systems and radio technologies, but also other systems and radio technologies. However, the following description describes a new radio (New Radio, NR) system for a purpose of example, and an NR term is used in many parts of the following description. These technologies are also applicable to an application other than an NR system application, such as a $6^{th}$ generation ($6^{th}$ Generation, 6G) communication system.

FIG. 1 is a block diagram of a wireless communication system to which an embodiment of this application is applicable. The wireless communication system includes a terminal 11 and a network side device 12. The terminal 11 may also be referred to as a terminal device or user equipment (User Equipment, UE). The terminal 11 may be a terminal-side device such as a mobile phone, a tablet personal computer (Tablet Personal Computer), a laptop computer (Laptop Computer) or a notebook computer, a personal digital assistant (Personal Digital Assistant, PDA), a palmtop computer, a netbook, an ultra-mobile personal computer (ultra-mobile personal computer, UMPC), a mobile Internet device (Mobile Internet Device, MID), a wearable device (Wearable Device) or vehicle user equipment (VUE), pedestrian user equipment (PUE), and the like. The wearable device includes: a bracelet, a headphone, glasses, and the like. It needs to be noted that, the embodiments of this application do not limit a specific type of the terminal 11. The network side device 12 may be a base station or a core network. The base station may be referred to as a node B, an evolved node B, an access point, a base transceiver station (Base Transceiver Station, BTS), a radio base station, a radio transceiver, a basic service set (Basic Service Set, BSS), an extended service set (Extended Service Set, ESS), a node B, an evolved node B (eNB), a home node B, a home evolved node B, a WLAN access point, a WiFi node, a transmitting receiving point (Transmitting Receiving Point, TRP), or some another suitable term in the described art. As long as the same technical effect is achieved, the base station is not limited to a specific technical term. It needs to be noted that, in the embodiments of this application, only a base station in the NR system is used as an example, but a specific type of the base station is not limited.

The following describes the method for establishing a connected state, the terminal, the core network function, and the access network device provided in the embodiments of this application in detail through specific embodiments and application scenarios thereof with reference to the accompanying drawings.

Referring to FIG. 2, the embodiments of this application provide a method for establishing a connected state. The method is performed by a first terminal, and the method includes:

Step 21: Receive first information sent by a second terminal, where the first information includes at least one of: a second identifier; and network access information.

Step 22: Send first indication information to a network side, where the first indication information includes at least one of: the second identifier; and the first identifier.

The second identifier is used for indicating, to the network side, that the second terminal enters a connected state, and the first identifier is used for indicating, to the network side, that the first terminal enters a connected state.

In the embodiments of this application, on the one hand, the first terminal may indicate, to the network side, that the second terminal enters the connected state, and the second terminal does not need to indicate the network side again, thus simplifying establishment processes of independent connected states of the two terminals, to effectively reduce signaling overhead. On the other hand, if the first terminal can obtain the network access information from the second terminal, the first terminal, when performing random access, may no longer have to obtain the network access information from the access network device, thereby further reducing the signaling overhead.

The method for establishing a connected state of the embodiments of this application is applicable to a relay architecture, such as a layer 2 (Layer 2, L2) relay architecture. Referring to FIG. 3, under the relay architecture, user equipment is connected to a relay terminal through a PC5 interface, the relay terminal is connected to an access network device through a Uu interface, and the access network device is connected to a core network, and is connected to a data network (Data Network, DN) through the core network. If the method for establishing a connected state of the embodiments of this application is applied to the relay architecture, one of the first terminal and the second terminal is the user equipment, and the other is the relay terminal. In other words, in some embodiments, the method for establishing a connected state may be performed by the user equipment, and in other embodiments, the method may alternatively be performed by the relay terminal. Certainly, the method for establishing a connected state of the embodiments of this application is also applicable to another communication architecture, and this is not limited in this application.

In the embodiments of this application, the first identifier and the second identifier are used to uniquely identify a terminal. Optionally, the first identifier and the second identifier may be identifiers assigned by a core network side for the first terminal and the second terminal, for example, the identifiers may be globally unique temporary UE identities (Globally Unique Temporary UE Identity, GUTI). Certainly, the first identifier and the second identifier may also be other types of identifiers, such as subscription concealed identifiers (Subscription Concealed Identifier, SUCI).

In the embodiments of this application, optionally, the first terminal receives the first information sent by the second terminal in a PC5 connection establishment process of the first terminal and the second terminal. Further optionally, the first information may be carried by a direct communication accept message in the PC5 connection establishment process. Certainly, in the embodiments of this application, the first information sent by the second terminal may also be received at another stage except the PC5 connection establishment process.

In the embodiments of this application, optionally, the first terminal sends, through the second terminal, the first indication information to the network side. Optionally, the network side may be a core network function, and further optionally, the core network function may be a core network function corresponding to the first terminal or a core network function corresponding to the second terminal. Optionally, the first indication information may be included in an RRC setup complete message (such as RRCSetupComplete).

In the embodiments of this application, optionally, the network access information is obtained by the second terminal from a random access process. Further optionally, the network access information is obtained by the second terminal from a Msg2 and/or Msg4 in the random access process. Optionally, the network access information includes at least one of: synchronization information of an access network device; beam information of the access network device; a contention resolution identifier; and radio resource control (Radio Resource Control, RRC) configuration information.

In the embodiments of this application, optionally, the method for establishing a connected state further includes: sending, through the second terminal, a Msg3 to the network side; and receiving, through the second terminal, a Msg4 from the network side. Optionally, the first terminal is the user equipment, and the second terminal is the relay terminal. That is, the user equipment sends, through the relay terminal, the Msg3 to the network side, and receives, through the relay terminal, the Msg4 from the network side, so that random access processes of the user equipment and the relay terminal may be performed simultaneously to reduce signaling overhead.

In the embodiments of this application, optionally, the method for establishing a connected state further includes: receiving a Msg3 sent by the second terminal and forwarding the Msg3 to the network side; and receiving a Msg4 from the network side and sending the Msg4 to the second terminal. Optionally, the first terminal is the relay terminal, and the second terminal is the user equipment. That is, user equipment sends, through the relay terminal, the Msg3 to the network side, and receives, through the relay terminal, the Msg4 from the network side, so that random access processes of the user equipment and the relay terminal may be performed simultaneously to reduce signaling overhead.

In some embodiments of this application, if the first terminal is the user equipment, the second terminal is the relay terminal, and the first information includes the network access information, the network access information is obtained by the relay terminal from the Msg2 in the random access process. That is, the relay terminal sends the network access information to the user equipment. In this case, the user equipment does not need to perform steps of the Msg1 and the Msg2 of the random access process. The user equipment may directly send, through the relay terminal, the Msg3 to the network side, and receive, through the relay terminal, the Msg4 sent by the network side, to complete a complete random access process.

In some embodiments of this application, if the first terminal is the user equipment, the second terminal is the relay terminal, and the first information does not include the network access information. That is, the relay terminal does not send the network access information to the user equipment. In this case, the user equipment needs to perform steps of the Msg1 and the Msg2 of the random access process. The user equipment sends, through the relay terminal, the Msg1 to the network side, and receives, through the relay terminal, the Msg2 sent by the network side, where the Msg2 includes the network access information; and then sends, through the relay terminal, the Msg3 to the network side, and receives, through the relay terminal, the Msg4 sent by the network side, to complete a complete random access process.

In the embodiments of this application, optionally, the Msg3 may carry the first identifier or the second identifier, to indicate, to the access network device, that the first terminal or the second terminal enters the connected state. If the first identifier and the second identifier are GUTIs, the GUTI includes two parts: a globally unique AMF identifier (Globally Unique AMF Identifier, GUAMI) and a 5G temporary mobile station identity (Temporary Mobile Station Identity, 5G-TMSI). The GUAMI includes an identifier of an access and mobility management function (Access and Mobility Management Function, AMF). In the embodiments of this application, only part of information in the GUTI (that is, the GUAMI) may be carried in the Msg3.

In some embodiments of this application, optionally, if the Msg3 carries the part of the information of the first identifier and the first indication information needs to carry the first identifier, the first indication information may carry another part or all of the information of the first identifier. Optionally, if the Msg3 carries the part of the information of the second identifier and the first indication information needs to carry the second identifier, the first indication information may carry another part or all of the information of the second identifier.

In some embodiments of this application, optionally, if the first terminal is the user equipment, and the second terminal is the relay terminal, the Msg3 carries the first identifier, and the network side is a core network function of the relay terminal. If the Msg3 carries the second identifier, the network side is a core network function of the user equipment.

Referring to FIG. 4, the embodiments of this application further provide a method for establishing a connected state. The method is performed by a second terminal, and the method includes:

Step 41: Send first information to a first terminal, where the first information includes at least one of: a second identifier; and network access information.

The second identifier is used for indicating, to a network side, that the second terminal enters a connected state.

In the embodiments of this application, on the one hand, the second terminal sends the second identifier to the first terminal, so that the first terminal may indicate, to the network side, that the second terminal enters the connected state, and the second terminal does not need to indicate the network side again, thus simplifying establishment processes of independent connected states of the two terminals, to effectively reduce signaling overhead. On the other hand, the second terminal may further send the network access information to the first terminal, so that the first terminal, when performing random access, may no longer have to obtain the network access information from the access network device, thereby further reducing the signaling overhead.

The method for establishing a connected state of the embodiments of this application is applicable to the relay architecture, one of the first terminal and the second terminal is the user equipment, and the other is the relay terminal. In other words, in some embodiments, the method for establishing a connected state may be performed by the user equipment, and in other embodiments, the method may alternatively be performed by the relay terminal. Certainly, the method for establishing a connected state of the embodiments of this application is also applicable to another communication architecture, and this is not limited in this application.

In the embodiments of this application, the second identifier is used for uniquely identifying a terminal. Optionally, the identifier may be assigned by a core network side for the second terminal, for example, the identifier may be a GUTI. Certainly, the second identifier may also be another type of identifier, such as a SUCI.

In the embodiments of this application, optionally, the second terminal sends the first information to the first terminal in a PC5 connection establishment process of the first terminal and the second terminal. Further optionally, the first information may be carried by a direct communication accept message in the PC5 connection establishment process. Certainly, in the embodiments of this application, the first information may also be sent to the second terminal at another stage except the PC5 connection establishment process.

In the embodiments of this application, optionally, the network access information is obtained by the second terminal from a random access process. Further optionally, the network access information is obtained by the second terminal from a Msg2 and/or Msg4 in the random access process. Optionally, the network access information includes at least one of: synchronization information of an access network device; beam information of the access network device; contention resolution identifier; and RRC configuration information.

In some embodiments of this application, optionally, the second terminal is the relay terminal and the first terminal is the user equipment. If the relay terminal is in an idle state, the first information includes the second identifier, that is, the relay terminal requires the user equipment to indicate, to the network side, that the relay terminal enters a connected state. If the relay terminal is in the connected state, the first information does not include the second identifier, that is, the relay terminal no longer requires the user equipment to indicate, to the network side, that the relay terminal enters the connected state.

In some embodiments of this application, optionally, the second terminal is the relay terminal and the first terminal is the user equipment. If the relay terminal is in the idle state, the method further includes: sending a Msg1 to the network side; and receiving a Msg2 sent by the network side, where the Msg2 includes the network access information. The first information includes the network access information.

In some embodiments of this application, optionally, the method further includes:

receiving first indication information sent by the first terminal, and forwarding the first indication information to the network side, where the first indication information includes at least one of: the second identifier; and the first identifier, where the first identifier is used for indicating, to the network side, that the first terminal enters a connected state.

Referring to FIG. 5, the embodiments of this application further provide a method for establishing a connected state. The method is performed by a first core network function, and the method includes:

Step 51: Receive first indication information and send second indication information to a second core network function.

The first indication information includes at least one of: a second identifier, and a first identifier.

The second indication information includes any one of: the second identifier, and the first identifier.

The second identifier is used for indicating, to the second core network function, that a second terminal indicated by the second identifier enters a connected state, and the first identifier is used for indicating, to the second core network function, that a first terminal indicated by the first identifier enters a connected state.

In the embodiments of this application, the first core network function may indicate, to the second core network function, that a terminal under the second core network function enters a connected state, and the terminal does not need to indicate the network side again, thus simplifying establishment processes of independent connected states of the two terminals, to effectively reduce signaling overhead.

Optionally, the first core network function receives first indication information sent by the first terminal, and the first terminal is user equipment or a relay terminal.

In the embodiments of this application, optionally, the first indication information is included in an RRC setup complete message (such as RRCSetupComplete).

In the embodiments of this application, optionally, the second indication information is included in an N14 message.

In the embodiments of this application, optionally, if the first core network function is a core network device of the user equipment and the second core network function is a core network device of the relay terminal, the second indication information is used for indicating, to the second core network function, that the relay terminal enters a connected state. If the first core network function is the core network device of the relay terminal and the second core network function is the core network device of the user equipment, the second indication information is used for indicating, to the second core network function, that the user equipment enters a connected state.

Referring to FIG. 6a, the embodiments of this application further provide a method for establishing a connected state. The method is performed by a first core network function, and the method includes:

Step 61a: Receive third indication information and send fourth indication information to an access network device.

The third indication information includes at least one of: the second identifier, and the first identifier.

The fourth indication information includes any one of: the second identifier, and the first identifier.

The second identifier is used for indicating, to the access network device, that a second terminal indicated by the second identifier enters a connected state, and the first identifier is used for indicating, to the access network device, that a first terminal indicated by the first identifier enters a connected state.

In the embodiments of this application, the first core network function may indicate, to the access network device, that a terminal enters a connected state, and the terminal does not need to indicate an access network side again, thereby effectively reducing signaling overhead.

In the embodiments of this application, optionally, if the first terminal and the second terminal belong to the first core network function, the third indication information is sent by the first terminal. The third indication information includes at least one of: the second identifier, and the first identifier.

In the embodiments of this application, optionally, if the first terminal and the second terminal belong to different core network functions, the third indication information is sent by a second core network function. The third indication information includes any one of: the second identifier, and the first identifier.

Optionally, one of the first terminal and the second terminal is user equipment, and the other is a relay terminal. One of the first core network function and the second core network function is a core network function of the user equipment, and the other is a core network function of the relay terminal.

In the embodiments of this application, optionally, the fourth indication information is included in an N2 message.

Referring to FIG. 6b, the embodiments of this application further provide a method for establishing a connected state. The method is performed by a second core network function, and the method includes:

Step 61b: Receive second indication information sent by a first core network function.

Step 62b: Send fourth indication information to an access network device.

The second indication information includes any one of: the second identifier, and the first identifier.

The fourth indication information includes any one of: the second identifier, and the first identifier.

The second identifier is used for indicating, to the second core network function or the access network device, that a second terminal indicated by the second identifier enters a connected state, and the first identifier is used for indicating, to the second core network function or the access network device, that a first terminal indicated by the first identifier enters a connected state.

In the embodiments of this application, the first core network function may indicate, to the second core network function, that a terminal under the second core network function enters a connected state, and the terminal does not need to indicate the network side again, thus simplifying establishment processes of independent connected states of the two terminals, to effectively reduce signaling overhead.

Optionally, one of the first terminal and the second terminal is user equipment and the other is a relay terminal.

In the embodiments of this application, optionally, the second indication information is included in an N14 message.

In the embodiments of this application, optionally, the fourth indication information is included in an N2 message.

In the embodiments of this application, optionally, if the first core network function is a core network device of the user equipment and the second core network function is a core network device of the relay terminal, the second indication information is used for indicating, to the second core network function, that the relay terminal enters a connected state. If the first core network function is the core network device of the relay terminal and the second core network function is the core network device of the user equipment, the second indication information is used for indicating, to the second core network function, that the user equipment enters a connected state.

Referring to FIG. 7, the embodiments of this application further provide a method for establishing a connected state. The method is performed by an access network device, and the method includes:

Step 71: Receive fourth indication information sent by a core network side.

The fourth indication information includes any one of: a second identifier, and a first identifier.

The second identifier is used for indicating, to the access network device, that a second terminal indicated by the second identifier enters a connected state, and the first identifier is used for indicating, to the access network device, that a first terminal indicated by the first identifier enters a connected state.

In the embodiments of this application, optionally, the fourth indication information is included in an N2 message.

In the foregoing embodiments, the core network function may be an AMF, and the access network device may be a base station.

It needs to be noted that, in the embodiments of this application, user equipment is remote UE, and a relay terminal is UE-to-Network relay UE which provides a UE-to-Network relay function for the user equipment.

The following describes the foregoing method for establishing a connected state by using examples with reference to specific embodiments.

Embodiment 1

In the embodiment of this application, a relay terminal is in an idle state. The relay terminal triggers a process of randomly accessing a Msg1 and a Msg2 by the relay terminal in a PC5 connection establishment process, and carries an identity and network access information of the relay terminal in a direct communication accept message. User equipment performs a subsequent random access process and carries identities of the user equipment and the relay terminal in a first indication message sent to a network side.

Referring to FIG. 8, a method for establishing a connected state of the embodiment of this application includes:

Step 80: User equipment performs initial registration, parameter configuration, and a discovery and selection process of a relay terminal.

Step 81: A PC5 connection establishment process includes:

81*a*: The user equipment sends a direct communication request message (Direct Communication Request Message) to the relay terminal.

81*b*: The user equipment establishes a safe connection with the relay terminal.

81*c*: The relay terminal performs random access processes: a Msg1 and a Msg2.

81*d*: The relay terminal sends first information to the user equipment, where the first information may be included in a direct communication accept message (Direct Communication Accept Message) sent by the relay terminal to the user equipment. The first information includes an identity (such as a GUTI) of the relay terminal and network access information obtained in the Msg2 by the relay terminal, for example, synchronization of a next generation radio access network (Next Generation Radio Access Network, NG-RAN), a beam, and the like.

The identity is the first identifier or the second identifier in the foregoing embodiments.

Step 82: A connected state establishment process includes:

82*a*: The user equipment performs a subsequent random access process and carries an identity (such as a GUTI) of the user equipment in a Msg3. The identity is the first identifier or the second identifier in the foregoing embodiments.

82*b*: The user equipment sends first indication information to an AMF of the user equipment. The first indication information includes the identity of the user equipment and the identity of the relay terminal, and is used for indicating that the user equipment and the relay terminal enter a connected state. The first indication information may be included in an RRC setup complete (such as RRCSetupComplete) message.

82*c*: The AMF of the user equipment sends second indication information to an AMF of the relay terminal. The second indication information includes the identity of the relay terminal, and is used for indicating, to the AMF of the relay terminal, that the relay terminal enters the connected state. The second indication information may be included in an N14 message.

82*d*: The AMF of the relay terminal sends fourth indication information to the NG-RAN. The fourth indication information includes the identity of the relay terminal for indicating, to the NG-RAN, that the relay terminal enters the connected state, and the fourth indication information may be included in the N2 message.

Embodiment 2

In the embodiment of this application, a relay terminal is in an idle state, and the relay terminal sends an identity of the relay terminal to user equipment in a PC5 connection establishment process. The user equipment triggers random access after a PC5 connection is successfully established, and carries identities of the user equipment and the relay terminal in first indication message sent to a network side.

Referring to FIG. 9, a method for establishing a connected state of the embodiment of this application includes:

Step 90: User equipment performs initial registration, parameter configuration, and a discovery and selection process of a relay terminal.

Step 91: A PC5 connection establishment process includes:

91*a*: The user equipment sends a direct communication request message (Direct Communication Request Message) to the relay terminal.

91*b*: The user equipment establishes a safe connection with the relay terminal.

91*d*: The relay terminal sends first information to the user equipment, where the first information may be included in a direct communication accept message (Direct Communication Accept Message) sent by the relay terminal to the user equipment. The first information includes an identity (such as a GUTI) of the relay terminal.

The identity is the first identifier or the second identifier in the foregoing embodiments.

Step 92: A connected state establishment process includes:

92*a*: The user equipment performs random access processes a Msg1 and a Msg2 to obtain network access information such as synchronization of an NG-RAN, a beam, and the like.

92*b*: The user equipment performs a subsequent random access process and carries an identity (such as a GUTI) of the user equipment in a Msg3. The identity is the first identifier or the second identifier in the foregoing embodiments.

92*c*: The user equipment sends first indication information to an AMF of the user equipment. The first indication information includes the identity of the user equipment and the identity of the relay terminal, and is used for indicating that the user equipment and the relay terminal enter a connected state. The first indication information may be included in an RRC setup complete (such as RRCSetupComplete) message.

92*d*: The AMF of the user equipment sends second indication information to an AMF of the relay terminal. The second indication information includes the identity of the relay terminal, and is used for indicating, to the AMF of the relay terminal, that the relay terminal enters the connected state. The second indication information may be included in an N14 message.

92*e*: The AMF of the relay terminal sends fourth indication information to the NG-RAN. The fourth indication information includes the identity of the relay terminal for indicating, to the NG-RAN, that the relay terminal enters the connected state, and the fourth indication information may be included in the N2 message.

Embodiment 3

In the embodiment of this application, a relay terminal is in a connected state, and the relay terminal sends network access information to user equipment in a PC5 connection establishment process. The user equipment performs a subsequent random access process and carries an identity of the user equipment in a first indication message sent to a network side.

Figure 10:
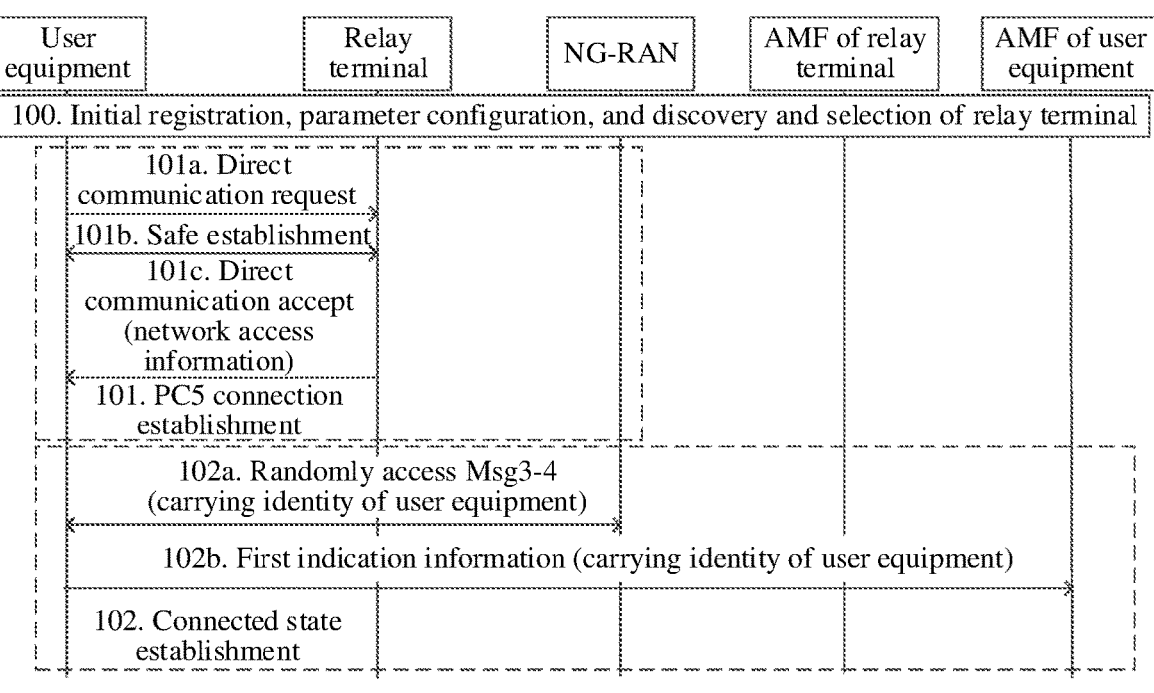
FIG. 10 is a schematic flowchart of a method for establishing a connected state according to a third embodiment of this application.

Referring to FIG. 10, a method for establishing a connected state of the embodiment of this application includes:

Step 100: User equipment performs initial registration, parameter configuration, and a discovery and selection process of a relay terminal.

Step 101: A PC5 connection establishment process includes:

101*a*: The user equipment sends a direct communication request message (Direct Communication Request Message) to the relay terminal.

101*b*: The user equipment establishes a safe connection with the relay terminal.

101*d*: The relay terminal sends first information to the user equipment, where the first information may be included in a direct communication accept message (Direct Communication Accept Message) sent by the relay terminal to the user equipment. The first information includes network access information.

Step 102: A connected state establishment process includes:

102*a*: The user equipment performs a subsequent random access process and carries an identity (such as a GUTI) of the user equipment in a Msg3. The identity is the first identifier or the second identifier in the foregoing embodiments.

102*b*: The user equipment sends first indication information to an AMF of the user equipment. The first indication information includes the identity of the user equipment, and is used for indicating that the user equipment enters a connected state. The first indication information may be included in an RRC setup complete (such as RRCSetupComplete) message.

Embodiment 4

In the embodiment of this application, a relay terminal is in an idle state. The relay terminal triggers a process of randomly accessing a Msg1 and a Msg2 by the relay terminal in a PC5 connection establishment process, and carries an identity and network access information of the relay terminal in a direct communication accept message. User equipment performs a subsequent random access process and carries identities of the user equipment and the relay terminal in a first indication message sent to a network side.

Figure 11:
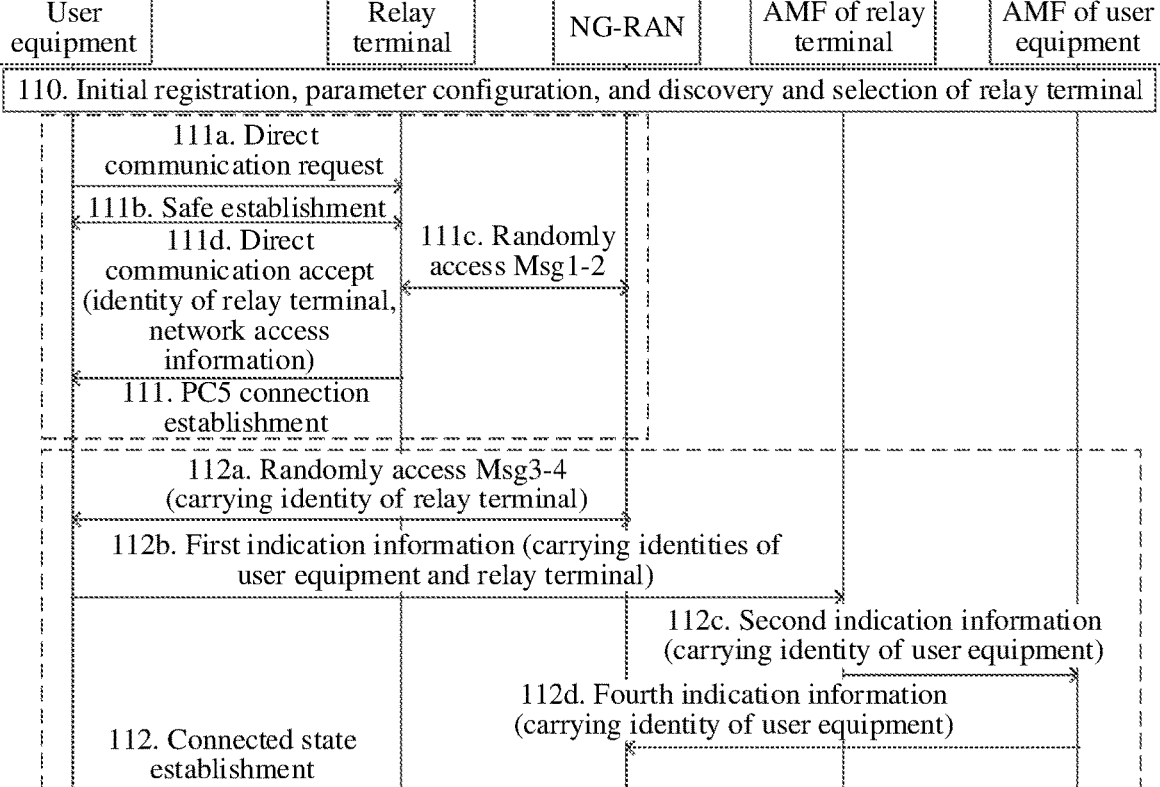
FIG. 11 is a schematic flowchart of a method for establishing a connected state according to a fourth embodiment of this application.

Referring to FIG. 11, a method for establishing a connected state of the embodiment of this application includes:

Step 110: User equipment performs initial registration, parameter configuration, and a discovery and selection process of a relay terminal.

Step 111: A PC5 connection establishment process includes:

111*a*: The user equipment sends a direct communication request message (Direct Communication Request Message) to the relay terminal.

111*b*: The user equipment establishes a safe connection with the relay terminal.

111*c*: The relay terminal performs random access processes: a Msg1 and a Msg2.

111*d*: The relay terminal sends first information to the user equipment, where the first information may be included in a direct communication accept message (Direct Communication Accept Message) sent by the relay terminal to the user equipment. The first information includes an identity (such as a GUTI) of the relay terminal and network access information obtained in the Msg2 by the relay terminal, for example, synchronization of an NG-RAN, a beam, and the like.

The identity is the first identifier or the second identifier in the foregoing embodiments.

Step 112: A connected state establishment process includes:

112*a*: The user equipment performs a subsequent random access process and carries an identity (such as a GUTI) of the relay terminal in a Msg3. The identity is the first identifier or the second identifier in the foregoing embodiments.

112*b*: The user equipment sends first indication information to an AMF of the relay terminal. The first indication information includes the identity of the user equipment and the identity of the relay terminal, and is used for indicating that the user equipment and the relay terminal enter a connected state. The first indication information may be included in an RRC setup complete (such as RRCSetupComplete) message.

112*c*: The AMF of the relay terminal sends second indication information to an AMF of the user equipment. The second indication information includes the identity of the user equipment, and is used for indicating, to the AMF of the user equipment, that the user equipment enters the connected state. The second indication information may be included in an N14 message.

112*d*: The AMF of the user equipment sends fourth indication information to the NG-RAN. The fourth indication information includes the identity of the user equipment for indicating, to the NG-RAN, that the user equipment enters the connected state, and the fourth indication information may be included in the N2 message.

Embodiment 5

In the embodiment of this application, a relay terminal is in an idle state, and the relay terminal sends an identity of the relay terminal to user equipment in a PC5 connection establishment process. The user equipment triggers random access after a PC5 connection is successfully established, and carries identities of the user equipment and the relay terminal in first indication message sent to an AMF of the relay terminal.

Figures 12, 13:
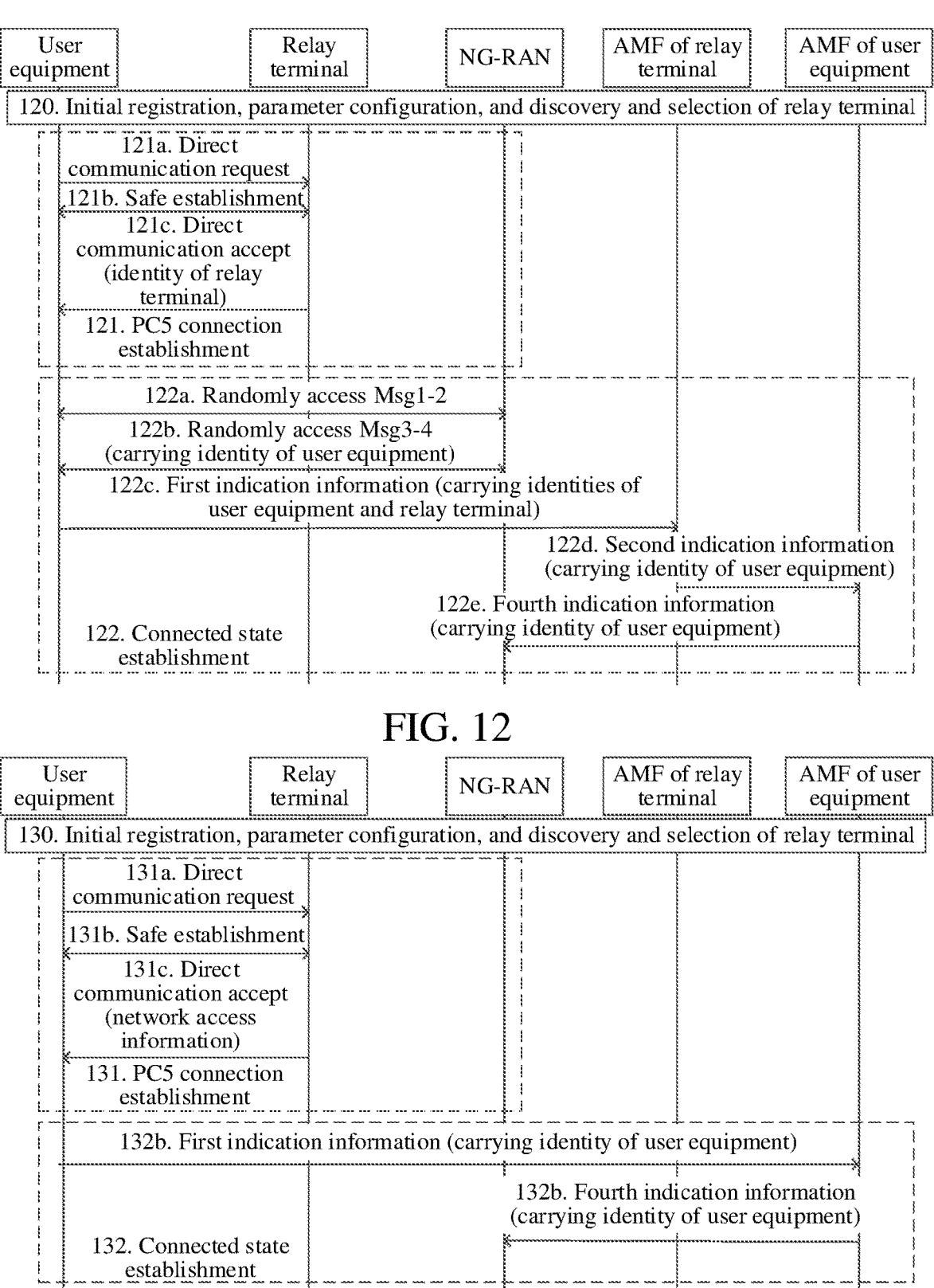
FIG. 12 is a schematic flowchart of a method for establishing a connected state according to a fifth embodiment of this application.
FIG. 13 is a schematic flowchart of a method for establishing a connected state according to a sixth embodiment of this application.

Referring to FIG. 12, a method for establishing a connected state of the embodiment of this application includes:

Step 120. User equipment performs initial registration, parameter configuration, and a discovery and selection process of a relay terminal.

Step 121. A PC5 connection establishment process includes:

121*a*: The user equipment sends a direct communication request message (Direct Communication Request Message) to the relay terminal.

121*b*: The user equipment establishes a safe connection with the relay terminal.

121*c*: The relay terminal sends first information to the user equipment, where the first information may be included in a direct communication accept message (Direct Communication Accept Message) sent by the relay terminal to the user equipment. The first information includes an identity (such as a GUTI) of the relay terminal.

The identity is the first identifier or the second identifier in the foregoing embodiments.

Step 122: A connected state establishment process includes:

122*a*: The user equipment performs random access processes a Msg1 and a Msg2 to obtain network access information such as synchronization of an NG-RAN, a beam, and the like.

122*b*: The user equipment performs a subsequent random access process and carries an identity (such as a GUTI) of the relay terminal in a Msg3. The identity is the first identifier or the second identifier in the foregoing embodiments.

122*c*: The user equipment sends first indication information to an AMF of the relay terminal. The first indication information includes the identity of the user equipment and the identity of the relay terminal, and is used for indicating that the user equipment and the relay terminal enter a connected state. The first indication information may be included in an RRC setup complete (such as RRCSetupComplete) message.

122*d*: The AMF of the relay terminal sends second indication information to an AMF of the user equipment. The second indication information includes the identity of the user equipment, and is used for indicating, to the AMF of the user equipment, that the user equipment enters the connected state. The second indication information may be included in an N14 message.

122*e*: The AMF of the user equipment sends fourth indication information to the NG-RAN. The fourth indication information includes the identity of the user equipment for indicating, to the NG-RAN, that the user equipment enters the connected state, and the fourth indication information may be included in the N2 message.

Embodiment 6

In the embodiment of this application, a relay terminal is in a connected state, and the relay terminal sends network access information to user equipment in a PC5 connection establishment process. The user equipment sends a first indication message to an AMF of the user equipment, to indicate that the user equipment enters a connected state.

Referring to FIG. 13, a method for establishing a connected state of the embodiment of this application includes:

Step 130: User equipment performs initial registration, parameter configuration, and a discovery and selection process of a relay terminal.

Step 131: A PC5 connection establishment process includes:

131*a*: The user equipment sends a direct communication request message (Direct Communication Request Message) to the relay terminal.

131*b*: The user equipment establishes a safe connection with the relay terminal.

131*d*: The relay terminal sends first information to the user equipment, where the first information may be included in a direct communication accept message (Direct Communication Accept Message) sent by the relay terminal to the user equipment. The first information includes network access information.

Step 132: A connected state establishment process includes:

132*a*: The user equipment sends first indication information to an AMF of the user equipment. The first indication information includes the identity of the user equipment, and is used for indicating that the user equipment enters a connected state. The first indication information may be included in an RRC setup complete (such as RRCSetupComplete) message.

132*b*: The AMF of the user equipment sends fourth indication information to the NG-RAN. The fourth indication information includes the identity of the user equipment for indicating that the user equipment enters the connected state, and the fourth indication information may be included in the N2 message.

It needs to be noted that, the method for establishing a connected state provided in the embodiments of this application may be performed by an apparatus for establishing a connected state or a control module included in the apparatus for establishing a connected state and configured to perform the method for establishing a connected state. In the embodiments of this application, the apparatus for establishing a connected state provided in the embodiments of this application is described by using an example in which the method for establishing a connected state is performed by the apparatus for establishing a connected state.

Figures 14, 15:
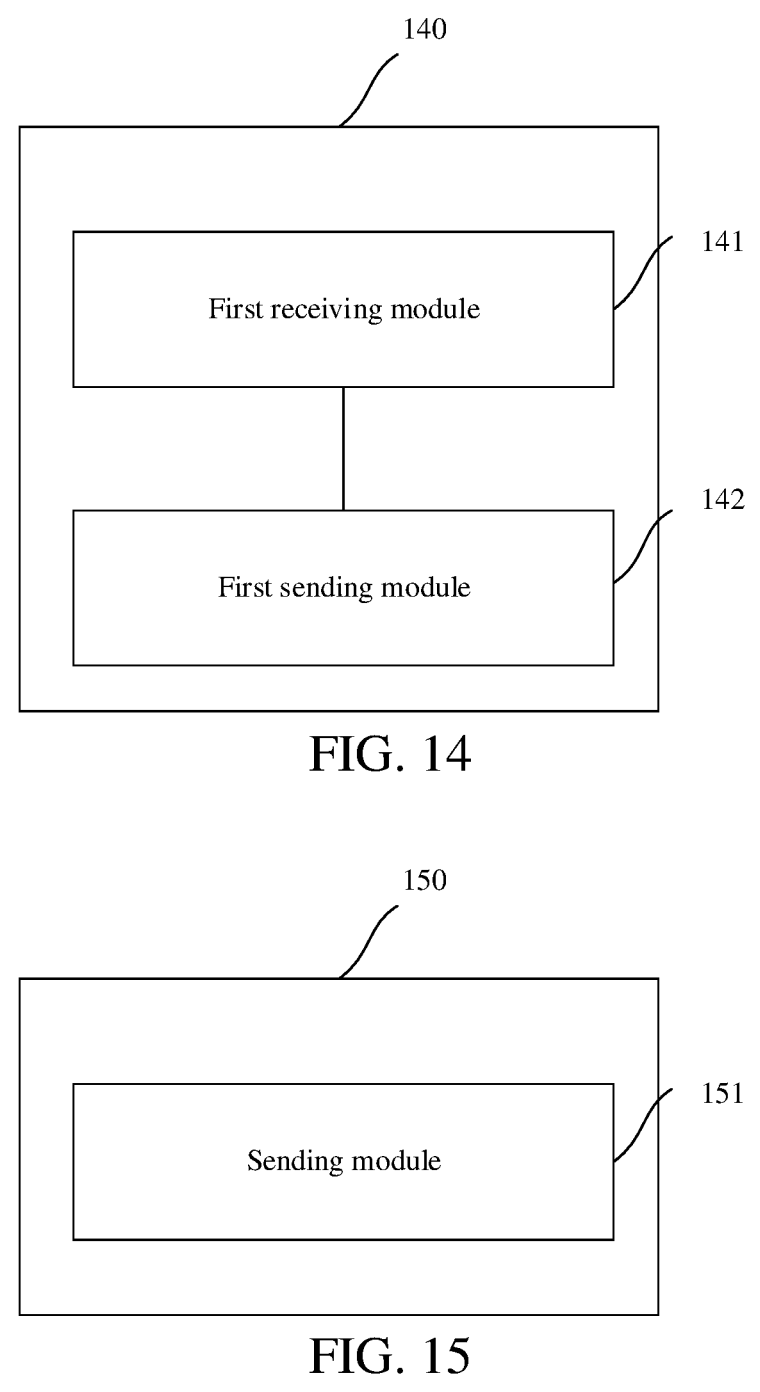

Referring to FIG. 14, the embodiments of this application further provide an apparatus 140 for establishing a connected state. The apparatus includes:

a first receiving module 141, configured to receive first information sent by a second terminal, where the first information includes at least one of: a second identifier, and network access information; and a first sending module 142, configured to send first indication information to a network side, where the first indication information includes at least one of: the second identifier, and the first identifier.

The second identifier is used for indicating, to the network side, that the second terminal enters a connected state, and the first identifier is used for indicating, to the network side, that a first terminal enters a connected state.

Optionally, the first sending module 142 is configured to send, through the second terminal, the first indication information to the network side.

Optionally, the network access information is obtained by the second terminal from a random access process.

Optionally, the network access information includes at least one of: synchronization information of an access network device; beam information of the access network device; contention resolution identifier; and radio resource control RRC configuration information.

Optionally, the first receiving module 141 is configured to receive the first information sent by the second terminal in a PC5 connection establishment process of the second terminal.

Optionally, the apparatus further includes:

a second sending module, configured to send, through the second terminal, a Msg3 to the network side; and a second receiving module, configured to receive, through the second terminal, a Msg4 from the network side.

Optionally, the apparatus further includes:

a third receiving module, configured to receive a Msg3 sent by the second terminal;

a third sending module, configured to forward the Msg3 to the network side;

a fourth receiving module, configured to receive a Msg4 from the network side; and a fourth sending module, configured to send the Msg4 to the second terminal.

The apparatus for establishing a connected state in the embodiments of this application may be an apparatus, or a component, an integrated circuit, or a chip in a terminal. The apparatus may be a mobile terminal or a non-mobile terminal. For example, the mobile terminal may include, but is not limited to, types of the terminal 11 listed above, and the non-mobile terminal may be a server, a network attached storage (Network Attached Storage, NAS), a personal computer (Personal Computer, PC), a television (Television, TV), a teller machine, or a self-service machine. This is not specifically limited in the embodiments of this application.

The apparatus for establishing a connected state in the embodiments of this application may be an apparatus with an operating system. The operating system may be an Android (Android) operating system, or may be an ios operating system or other possible operating systems, which is not specifically limited in the embodiments of this application.

The apparatus for establishing a connected state provided in the embodiments of this application can implement each process implemented by a method embodiment of FIG. 2, and achieve the same technical effect. To avoid repetition, details are not described herein again.

Referring to FIG. 15, the embodiments of this application further provide an apparatus 150 for establishing a connected state. The apparatus includes:

a sending module 151, configured to send first information to a first terminal, where the first information includes at least one of: a second identifier, and network access information.

The second identifier is used for indicating, to a network side, that the second terminal enters a connected state.

Optionally, the apparatus 150 for establishing a connected state further includes:

a receiving module, configured to receive first indication information sent by the first terminal, and forward the first indication information to the network side, where the first indication information includes at least one of: the second identifier, and the first identifier.

The first identifier is used for indicating, to the network side, that the first terminal enters a connected state.

Optionally, the network access information is obtained by the second terminal from a random access process.

The apparatus for establishing a connected state provided in the embodiments of this application can implement each process implemented by a method embodiment of FIG. 4, and achieve the same technical effect. To avoid repetition, details are not described herein again.

Figure 16:
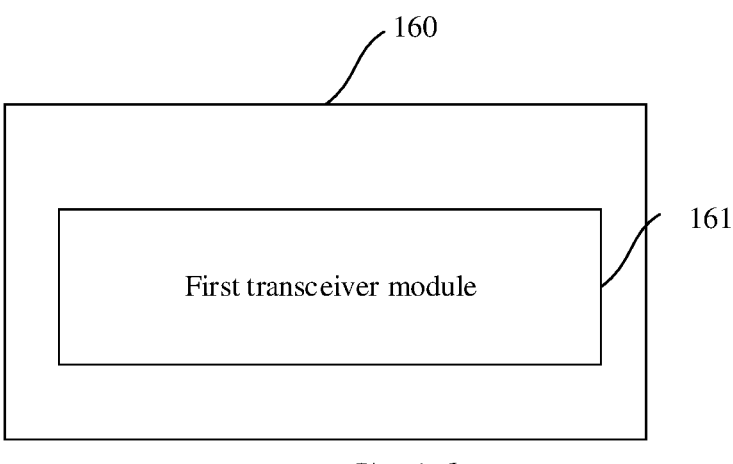
FIG. 16 is a schematic structural diagram of an apparatus for establishing a connected state according to another embodiment of this application.

Referring to FIG. 16, the embodiments of this application further provide an apparatus 160 for establishing a connected state. The apparatus includes:

a first transceiver module 161, configured to receive first indication information and send second indication information to a second core network function, where the first indication information includes at least one of: a second identifier, and a first identifier; and the second indication information includes any one of: the second identifier, and the first identifier.

The second identifier is used for indicating, to the second core network function, that a second terminal indicated by the second identifier enters a connected state, and the first identifier is used for indicating, to the second core network function, that a first terminal indicated by the first identifier enters a connected state.

The apparatus for establishing a connected state provided in the embodiments of this application can implement each process implemented by a method embodiment of FIG. 5, and achieve the same technical effect. To avoid repetition, details are not described herein again.

Figure 17A:
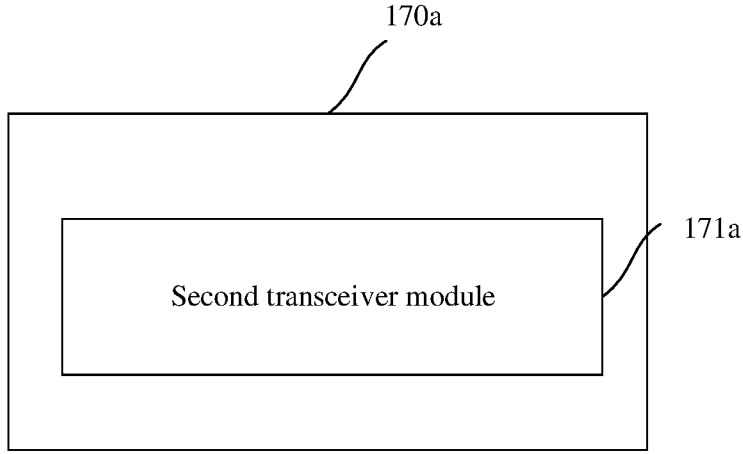
FIG. 17*a* is a schematic structural diagram of an apparatus for establishing a connected state according to another embodiment of this application.

Referring to FIG. 17a, the embodiments of this application further provide an apparatus 170a for establishing a connected state. The apparatus includes:

a second transceiver module 171a, configured to receive third indication information and send fourth indication information to an access network device, where the third indication information includes at least one of: the second identifier, and the first identifier; and the fourth indication information includes any one of: the second identifier, and the first identifier.

The second identifier is used for indicating, to the access network device, that a second terminal indicated by the second identifier enters a connected state, and the first identifier is used for indicating, to the access network device, that a first terminal indicated by the first identifier enters a connected state.

The apparatus for establishing a connected state provided in the embodiments of this application can implement each process implemented by a method embodiment of FIG. 6a, and achieve the same technical effect. To avoid repetition, details are not described herein again.

Figure 17B:
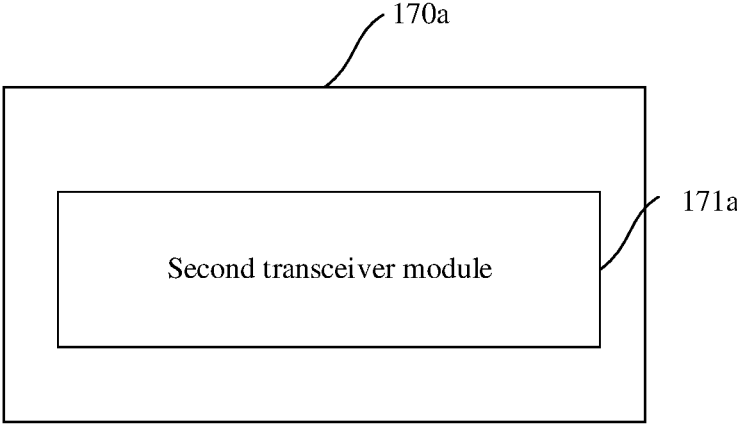
FIG. 17*b* is a schematic structural diagram of an apparatus for establishing a connected state according to another embodiment of this application.

Referring to FIG. 17b, the embodiments of this application further provide an apparatus 170b for establishing a connected state. The apparatus includes:

a receiving module 171b, configured to receive second indication information sent by a first core network function; and a sending module 172b, configured to send fourth indication information to an access network device, where the second indication information includes any one of: the second identifier, and the first identifier; and the fourth indication information includes any one of: the second identifier, and the first identifier.

The second identifier is used for indicating, to the second core network function or the access network device, that a second terminal indicated by the second identifier enters a connected state, and the first identifier is used for indicating, to the second core network function or the access network device, that a first terminal indicated by the first identifier enters a connected state.

In the embodiments of this application, the first core network function may indicate, to the second core network function, that a terminal under the second core network function enters a connected state, and the terminal does not need to indicate the network side again, thus simplifying establishment processes of independent connected states of the two terminals, to effectively reduce signaling overhead.

Optionally, one of the first terminal and the second terminal is user equipment and the other is a relay terminal.

In the embodiments of this application, optionally, the second indication information is included in an N14 message.

In the embodiments of this application, optionally, the fourth indication information is included in an N2 message.

In the embodiments of this application, optionally, if the first core network function is a core network device of the user equipment and the second core network function is a core network device of the relay terminal, the second indication information is used for indicating, to the second core network function, that the relay terminal enters a connected state. If the first core network function is the core network device of the relay terminal and the second core network function is the core network device of the user equipment, the second indication information is used for indicating, to the second core network function, that the user equipment enters a connected state.

The apparatus for establishing a connected state provided in the embodiments of this application can implement each process implemented by a method embodiment of FIG. 6b, and achieve the same technical effect. To avoid repetition, details are not described herein again.

Figures 18, 19:
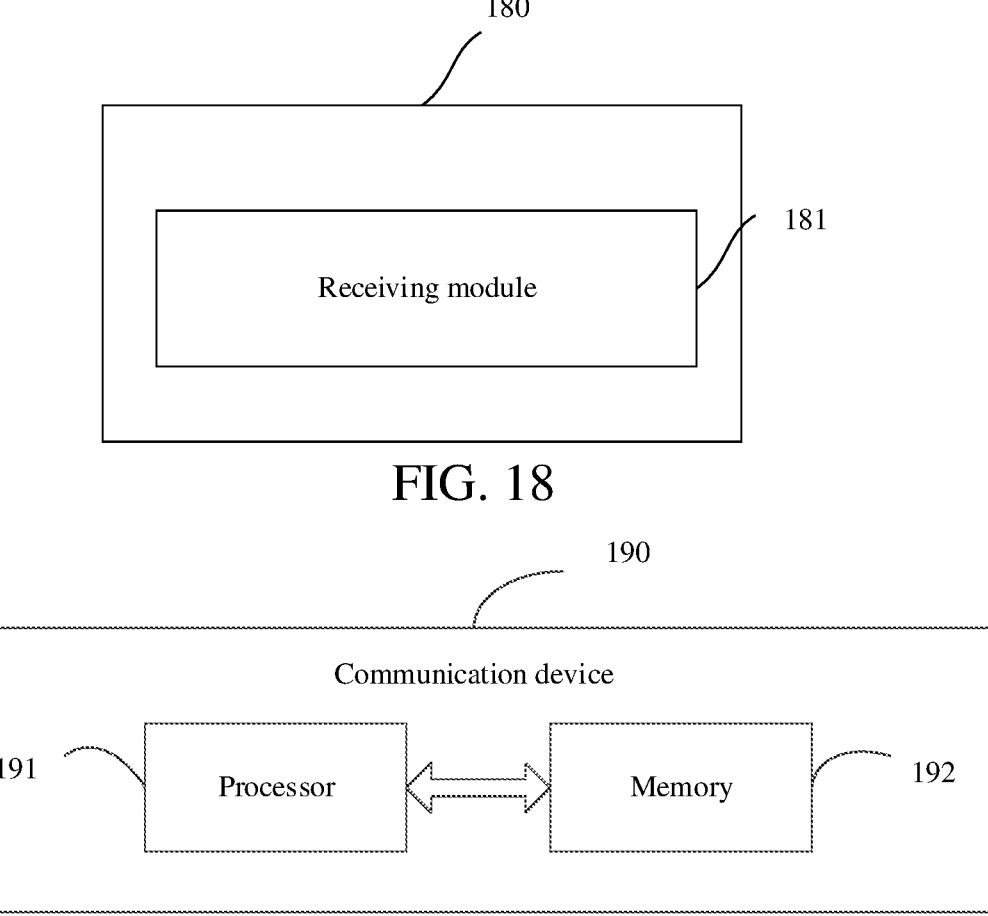
FIG. 18 is a schematic structural diagram of an apparatus for establishing a connected state according to another embodiment of this application.
FIG. 19 is a schematic structural diagram of a communication device according to an embodiment of this application.

Referring to FIG. 18, the embodiments of this application further provide an apparatus 180 for establishing a connected state. The apparatus includes:

a receiving module 181, configured to receive fourth indication information sent by a core network side, where the fourth indication information includes any one of: a second identifier, and a first identifier.

The second identifier is used for indicating, to the access network device, that a second terminal indicated by the second identifier enters a connected state, and the first identifier is used for indicating, to the access network device, that a first terminal indicated by the first identifier enters a connected state.

The apparatus for establishing a connected state provided in the embodiments of this application can implement each process implemented by a method embodiment of FIG. 7, and achieve the same technical effect. To avoid repetition, details are not described herein again.

As shown in FIG. 19, the embodiments of this application further provide a communication device 190. The communication device 190 includes a processor 191, a memory 192, and a program or an instruction stored in the memory 192 and executable in the processor 191. For example, when the communication device 190 is a terminal, the program or instruction is executed by the processor 191 to implement processes of the foregoing embodiments of the method for establishing a connected state shown in FIG. 2 or FIG. 4, and the same technical effect can be achieved. When the communication device 190 is a network side device, the program or instruction is executed by the processor 191 to implement processes of the foregoing embodiments of the method for establishing a connected state shown in FIG. 5, FIG. 6, or FIG. 7, and the same technical effect can be achieved. To avoid repetition, details are not described herein again.

Figure 20:
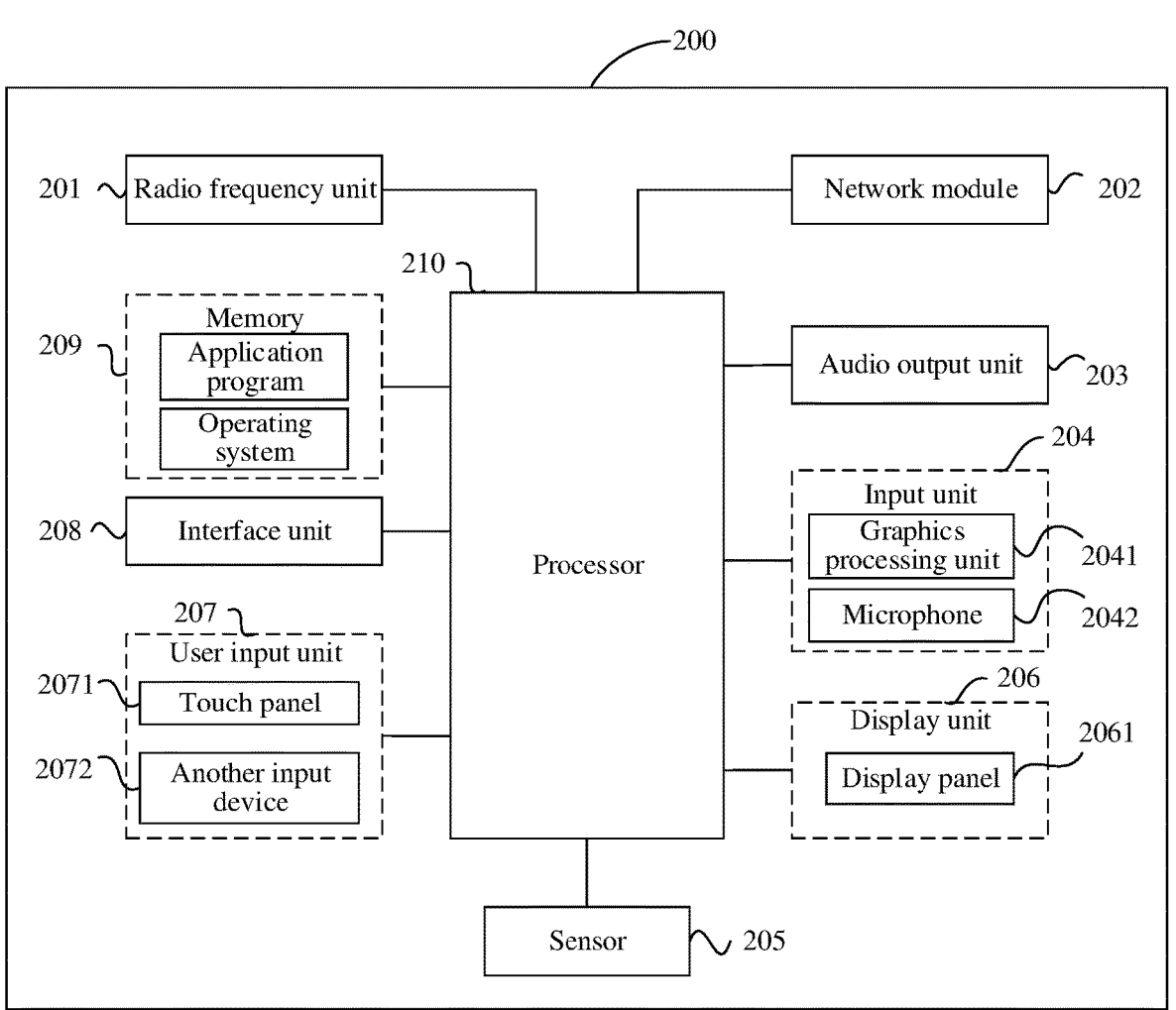
FIG. 20 is a schematic structural diagram of a terminal according to an embodiment of this application.

FIG. 20 is a schematic structural diagram of hardware of a terminal implementing an embodiment of this application. The terminal 200 includes, but is not limited to: components such as a radio frequency unit 201, a network module 202, an audio output unit 203, an input unit 204, a sensor 205, a display unit 206, a user input unit 207, an interface unit 208, a memory 209, and a processor 210.

Those skilled in the art may understand that the terminal 200 may further include a power supply (such as a battery) for supplying power to the components. The power supply may be logically connected to the processor 210 by using a power supply management system, thereby implementing functions such as charging, discharging, and power consumption management, by using the power supply management system. A terminal structure shown in FIG. 20 does not constitute a limitation to the terminal, and the terminal may include more or fewer components than those shown in the figure, or some components may be combined, or a different component deployment may be used. Details are not described herein again.

It should be understood that in the embodiments of this application, the input unit 204 may include a graphics processing unit (Graphics Processing Unit, GPU) 2041 and a microphone 2042, and the graphics processing unit 2041 processes image data of a still picture or a video obtained by an image capture apparatus (such as a camera) in a video capture mode or an image capture mode. The display unit 206 may include a display panel 2061. The display panel 2061 may be configured by using a liquid crystal display, an organic light-emitting diode, or the like. The user input unit 207 includes a touch panel 2071 and another input device 2072. The touch panel 2071 is also referred to as a touch screen. The touch panel 2071 may include two parts: a touch detection apparatus and a touch controller. The another input device 2072 may include, but is not limited to, a physical keyboard, a functional key (for example, a volume control key or a switch key), a track ball, a mouse, and a joystick, and the details are not described herein again.

In the embodiments of this application, the radio frequency unit 201 is configured to receive downlink data from a network side device and transmit the downlink data to the processor 210 for processing; and send uplink data to the network side device. Generally, the radio frequency unit 201 includes, but is not limited to, an antenna, at least one amplifier, a transceiver, a coupler, a low noise amplifier, a duplexer, and the like.

The memory 209 may be configured to store a software program or instruction and various data. The memory 209 may mainly include a program or instruction storage area and a data storage area. The program or instruction storage area may store an operating system, an application program or instruction required by at least one function (for example, a sound playback function and an image display function), and the like. In addition, the memory 209 may include a high-speed random access memory and may also include a non-volatile memory. The non-volatile memory may be a read-only memory (Read-Only Memory, ROM), a programmable read-only memory (Programmable ROM, PROM), an erasable programmable read-only memory (Erasable PROM, EPROM), an electrically erasable programmable read-only memory (Electrically EPROM, EEPROM), or a flash memory. The memory 209 may include, for example, at least one magnetic disk memory device, a flash memory device, or other non-volatile solid-state memory devices.

The processor 210 may include one or more processing units. Optionally, the processor 210 may integrate an application processor and a modem processor, where the application processor mainly processes an operating system, a user interface, an application program or instruction, and the like, and the modem processor mainly processes wireless communication, such as a baseband processor. It may be understood that the modem processor may alternatively not be integrated into the processor 210.

The radio frequency unit 201 is configured to receive first information sent by a second terminal, and the first information includes at least one of: a second identifier, and network access information.

The radio frequency unit 201 is further configured to send first indication information to a network side, and the first indication information includes at least one of: the second identifier, and the first identifier.

The second identifier is used for indicating, to the network side, that the second terminal enters a connected state, and the first identifier is used for indicating, to the network side, that the first terminal enters a connected state.

Optionally, the first terminal sends, through the second terminal, the first indication information to the network side.

Optionally, the network access information is obtained by the second terminal from a random access process.

Optionally, the network access information includes at least one of: synchronization information of an access network device; beam information of the access network device; contention resolution identifier; and RRC configuration information.

Optionally, the first terminal receives the first information sent by the second terminal in a PC5 connection establishment process of the first terminal and the second terminal.

Optionally, the radio frequency unit 201 is further configured to send, through the second terminal, a Msg3 to the network side; and the radio frequency unit 201 is further configured to receive, through the second terminal, a Msg4 from the network side.

Optionally, the radio frequency unit 201 is further configured to receive a Msg3 sent by the second terminal and forward the Msg3 to the network side; and the radio frequency unit 201 is further configured to receive a Msg4 from the network side and send the Msg4 to the second terminal.

Figure 21:
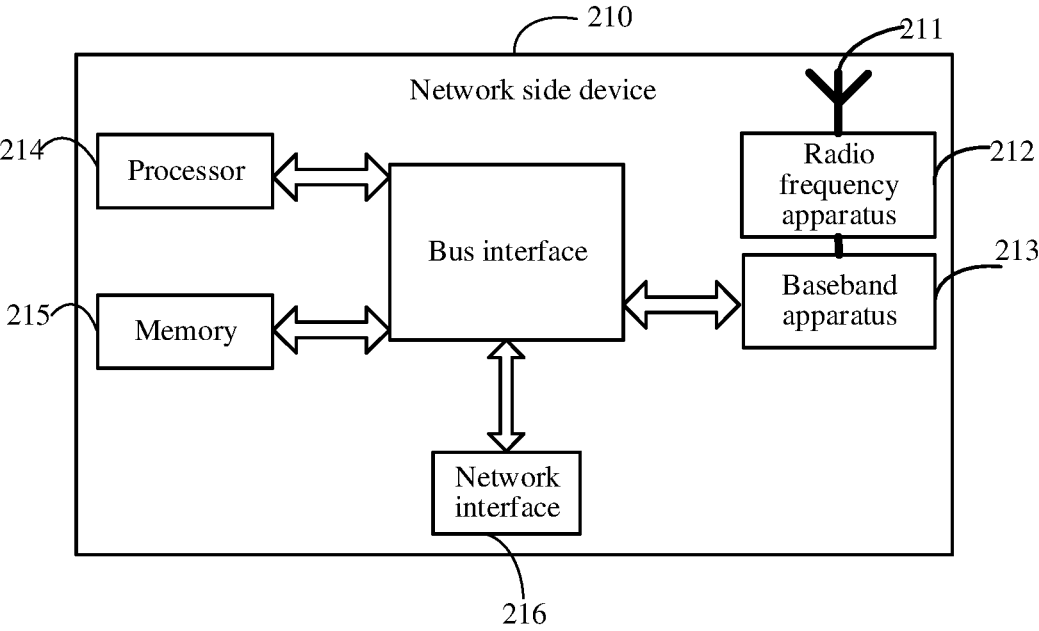
FIG. 21 is a schematic structural diagram of an access network device according to an embodiment of this application.

The embodiments of this application further provide an access network device. As shown in FIG. 21, the access network device 210 includes: an antenna 211, a radio frequency apparatus 212, and a baseband apparatus 213. The antenna 211 is connected to the radio frequency apparatus 212. In an uplink direction, the radio frequency apparatus 212 receives information through the antenna 211, and sends the received information to the baseband apparatus 213 for processing. In a downlink direction, the baseband apparatus 213 processes to-be-sent information, and sends the information to the radio frequency apparatus 212. The radio frequency apparatus 212 processes the received information and sends the information through the antenna 211.

The frequency band processing apparatus may be located in the baseband apparatus 213. The method performed by the access network device in the foregoing embodiments may be implemented in the baseband apparatus 213, and the baseband apparatus 213 includes a processor 214 and a memory 215.

The baseband apparatus 213 may include, for example, at least one baseband plate. A plurality of chips are disposed on the baseband plate. As shown in FIG. 21, one of the plurality of chips is, for example, the processor 214, and is connected to the memory 215, to invoke a program in the memory 215 to perform operations of the access network device in the foregoing method embodiments.

The baseband apparatus 213 may further include a network interface 216, configured to exchange information with the radio frequency apparatus 212. The interface is, for example, a common public radio interface (Common Public Radio Interface, CPRI).

Specifically, the access network device of the embodiments of this application further includes: an instruction or program stored in the memory 215 and executable in the processor 214. The processor 214 invokes the instruction or program in the memory 215 to perform the method performed by each module shown in FIG. 18 and achieve the same technical effect. To avoid repetition, details are not described herein again.

The embodiments of this application further provide a readable storage medium, and the readable storage medium may be volatile or non-volatile. The readable storage medium stores a program or an instruction. The program or instruction, when executed by a processor, implements the processes of the embodiments of the method for establishing a connected state performed by the first terminal, the second terminal, the first core network function, or the access network device, and the same technical effects can be achieved. To avoid repetition, details are not described herein again.

The processor is a processor in the terminal in the foregoing embodiments. The readable storage medium includes a computer-readable storage medium, for example, a computer read-only memory (Read-Only Memory, ROM), a random access memory (Random Access Memory, RAM), a magnetic disk, or an optical disc.

The embodiments of this application further provide a chip. The chip includes a processor and a communication interface. The communication interface is coupled to the processor, and the processor is configured to run a program or an instruction of a network side device to implement processes of the embodiments of the method for establishing a connected state performed by the first terminal, the second terminal, the first core network function, or the access network device, and the same technical effect can be achieved. To avoid repetition, details are not described herein again.

It should be noted that, the chip mentioned in the embodiments of this application may also be referred to as a system-level chip, a system chip, a chip system, a system on chip, or the like.

The embodiments of this application further provide a computer program product. The computer program product is stored in a non-transitory storage medium. The computer program product is executed by at least one processor to implement processes of the foregoing embodiments of the method for establishing a connected state performed by the first terminal, the second terminal, the first core network function, or the access network device, and the same technical effect can be achieved. To avoid repetition, details are not described herein again.

It needs to be noted that, terms "include", "comprise", and any variants thereof are intended to cover a non-exclusive inclusion. Therefore, in the context of a process, method, object, or apparatus that includes a series of elements, the process, method, object, or apparatus not only includes such elements, but also includes other elements not specified expressly, or may include inherent elements of the process, method, object, or apparatus. Without more limitations, elements defined by a sentence "including one" does not exclude that there are still other same elements in the process, method, object, or apparatus. Furthermore, it should be noted that a scope of the methods and apparatus in the embodiments of this application is not limited to performing the functions in the order shown or discussed, but may also include performing the functions in a substantially simultaneous manner or in the reverse order depending on the functions involved. For example, the methods described may be performed in an order different from that described, and various steps may also be added, omitted, or combined. In addition, features described with reference to some examples may be combined in other examples.

Through the descriptions of the foregoing implementations, a person skilled in the art may clearly understand that the method according to the foregoing embodiments may be implemented through software and a necessary general hardware platform, and certainly, may also be implemented through hardware, but in many cases, the former manner is a better implementation. Based on such an understanding, the technical solutions of this application essentially, or the part contributing to the prior art may be implemented in a form of a software product. The computer software product is stored in a storage medium (for example, a ROM/RAM, a magnetic disk, or an optical disc), and includes several instructions for instructing a terminal (which may be a mobile phone, a computer, a server, an air conditioner, a network device, or the like) to perform the methods according to the embodiments of this application.

Although the embodiments of this application have been described above with reference to the accompanying drawings, this application is not limited to the specific implementations described above, and the specific implementations described above are merely exemplary and not limitative. A person of ordinary skill in the art may make various variations under the teaching of this application without departing from the spirit of this application and the protection scope of the claims, and such variations shall all fall within the protection scope of this application.

What is claimed is:

1. A method for establishing a connected state, performed by a first terminal, the method comprising:
   receiving first information sent by a second terminal, wherein the first information comprises a second identifier, or the first information comprises the second identifier and network access information; and
   sending first indication information to a first core network function, wherein the first indication information comprises the second identifier, and a first identifier, wherein
   the second identifier is used for indicating, to the first core network function, that the second terminal enters a connected state, and the first identifier is used for indicating, to the first core network function, that the first terminal enters a connected state.

2. The method according to claim 1, wherein the first terminal sends, through the second terminal, the first indication information to the first core network function.

3. The method according to claim 1, wherein the network access information is obtained by the second terminal from a random access process.

4. The method according to claim 1, wherein the network access information comprises at least one of: synchronization information of an access network device; beam information of the access network device; contention resolution identifier; and radio resource control RRC configuration information.

5. The method according to claim 1, wherein the first terminal receives the first information sent by the second terminal in a PC5 connection establishment process of the first terminal and the second terminal.

6. The method according to claim 1, further comprising:
   sending, through the second terminal, a Msg3 to a network side; and
   receiving, through the second terminal, a Msg4 from the network side.

7. The method according to claim 1, further comprising:
   receiving a Msg3 sent by the second terminal and forwarding the Msg3 to the to a network side; and
   receiving a Msg4 from the network side and sending the Msg4 to the second terminal.

8. A first terminal, comprising a processor, a memory, and a program or an instruction stored in the memory and executable in the processor, wherein the program or instruction is executed by the processor to perform:
   receiving first information sent by a second terminal, wherein the first information comprises a second identifier, or the first information comprises the second identifier and network access information; and
   sending first indication information to a first core network function, wherein the first indication information comprises the second identifier, and a first identifier, wherein
   the second identifier is used for indicating, to the first core network function, that the second terminal enters a connected state, and the first identifier is used for indicating, to the first core network function, that the first terminal enters a connected state.

9. The first terminal according to claim 8, wherein the first terminal sends, through the second terminal, the first indication information to the first core network function.

10. The first terminal according to claim 8, wherein the network access information is obtained by the second terminal from a random access process.

11. The first terminal according to claim 8, wherein the network access information comprises at least one of: synchronization information of an access network device; beam information of the access network device; contention resolution identifier; and radio resource control RRC configuration information.

12. The first terminal according to claim 8, wherein the first terminal receives the first information sent by the second terminal in a PC5 connection establishment process of the first terminal and the second terminal.

13. The first terminal according to claim 8, wherein the program or instruction is executed by the processor to perform:
   sending, through the second terminal, a Msg3 to a network side; and
   receiving, through the second terminal, a Msg4 from the network side.

14. The first terminal according to claim 8, wherein the program or instruction is executed by the processor to perform:
   receiving a Msg3 sent by the second terminal and forwarding the Msg3 to the to a network side; and
   receiving a Msg4 from the network side and sending the Msg4 to the second terminal.

* * * * *